US010591630B2

(12) United States Patent
Berheide et al.

(10) Patent No.: US 10,591,630 B2
(45) Date of Patent: Mar. 17, 2020

(54) NUCLEAR WELL LOGGING TOOL WITH AT LEAST ONE GAMMA-RAY SCINTILLATION DETECTOR EMPLOYING A THALLIUM-BASED SCINTILLATOR MATERIAL

(71) Applicant: SCHLUMBERGER TECHNOLOGY CORPORATION, Sugar Land, TX (US)

(72) Inventors: Markus Berheide, Medford, MA (US); Cornelis Huiszoon, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 346 days.

(21) Appl. No.: 15/469,722

(22) Filed: Mar. 27, 2017

(65) Prior Publication Data
US 2018/0275309 A1   Sep. 27, 2018

(51) Int. Cl.
G01V 5/10 (2006.01)
(52) U.S. Cl.
CPC .................................. G01V 5/101 (2013.01)
(58) Field of Classification Search
USPC ...................................................... 250/269.6
See application file for complete search history.

(56) References Cited

U.S. PATENT DOCUMENTS

2012/0312994 A1*  12/2012  Nikitin ................. G01T 1/2002
                                                                250/362
2016/0223707 A1    8/2016  Allen
2016/0291169 A1   10/2016  Hawrami et al.
2016/0299251 A1   10/2016  Luo et al.
(Continued)

FOREIGN PATENT DOCUMENTS

WO   WO-2014126571 A1 *  8/2014  ............. G01T 1/202
WO       2016153520 A1     9/2016

OTHER PUBLICATIONS

Boatner, L. A. et al., "The characteristics of scintillator performance at temperatures up to 400° C.", Nuclear Instruments and Methods in Physics Research A, 2013, 709, pp. 95-97.
(Continued)

Primary Examiner — David P Porta
Assistant Examiner — Meenakshi S Sahu

(57) ABSTRACT

A subsurface logging tool that is deployable in a wellbore that traverses a formation includes a gamma-ray scintillation detector with a thallium-based scintillator material. The scintillator material is suitable for high-temperature downhole environments (i.e., above 70° C.). As such, the scintillator material improves the performance of oilfield measurement(s) at temperatures above 70° C. and at least up to 175° C., when compared with the use of the other materials. The scintillator material may have an effective atomic number of at least sixty. The scintillator material may have the chemical formula $Tl_2LiY_{1-x}Ce_xCl_6$, where x is 0 to 1. Lithium (Li) may be partially or completely replaced by another alkali metal or by indium (In). Yttrium (Y) is partially or completely replaced by another rare earth element. Chlorine (Cl) is partially or completely replaced by another halide.

22 Claims, 10 Drawing Sheets

(56) References Cited

U.S. PATENT DOCUMENTS

2017/0355905 A1* 12/2017 Bourret-Courchesne .................... G01T 1/2023

OTHER PUBLICATIONS

Bizarri, G. et al., "Scintillation properties of a 1 inch × 1 inch LaBr3—(5%) Ce crystal", IEEE Transactions on Nuclear Science, 2006, 53(2), pp. 615-619.

Kim, H. J. et al., "Luminescence and scintillation properties of the new Ce-doped Tl2LiGdCl6 single crystals", Journal of Luminescence, 2015 164, pp. 86-89.

Kim, H. J. et al., "Investigations of scintillation characterization of Ce-activated Tl2LiGdBr6 single crystal", Radiation Measurements, 2016, 90, pp. 279-281.

Kim, H. J. et al., "Tl2LiCl6 (Ce3+)—New Tl-based Elpasolite Scintillator Material", IEEE Transactions on Nuclear Science, 2016, 63(2), pp. 439-442.

Kobayashi, M. et al., "Phosphors for X-ray and ionizing radiation" in Chapter 7 of Phosphor Handbook, 2nd Edition, Eds.: W.M. Yen, S. Shionoya and H. Yamamoto, CRC Press, Boca Raton, 2007, 62 pages.

Kobayashi, M. et al., "Bismuth Silicate as a Scintillating Material for Electromagnetic Shower Detectors", Nuclear Instruments and Methods in Physics Research, 1983, 205(1-2), pp. 133-136.

Sakai, E., "Recent Measurements on Scintillator-Photodetector Systems", IEEE Transactions on Nuclear Science, 1987, 34(1), pp. 418-422.

\* cited by examiner

NUCLEAR WELL LOGGING TOOL WITH AT LEAST ONE GAMMA-RAY SCINTILLATION DETECTOR EMPLOYING A THALLIUM-BASED SCINTILLATOR MATERIAL

TECHNICAL FIELD

The present disclosure relates to nuclear well logging tools that include one or more gamma-ray scintillation detectors.

BACKGROUND

Spectroscopic analysis of data from nuclear well logging operations can provide quantitative or qualitative information related to a geological formation surrounding a borehole. In the context of formation evaluation, the term formation refers to the volume of rock seen by a measurement made in the borehole, as in a log or a well test. These measurements indicate the physical properties of this volume.

Data on downhole conditions and movement of the drilling assembly can be collected during or after the drilling process. By collecting and processing such information during the drilling process, the driller can modify or correct key steps of the operation to optimize well placement. Schemes for collecting data of downhole conditions and movement of the drilling assembly during the drilling operation are commonly referred to as measurement-while-drilling ("MWD"). Similar techniques focusing more on the measurement of formation parameters during the drilling process are commonly referred to as logging-while-drilling ("LWD"). However, the terms MWD and LWD are often used interchangeably, and the use of either term in this disclosure will be understood to include both the collection of formation and borehole information as well as data on movement and placement of the drilling assembly. Wireline logging tools can be conveyed in a wellbore by a wireline cable, drill pipe, coiled tubing, tractor, or other suitable tool conveyance means.

For example, the formation may scatter radiation artificially introduced into it by a nuclear well logging tool. Specifically, the nuclear well logging tool can include a neutron source that bombards the formation with neutrons, which interact with nuclei in the formation to produce gamma-ray radiation. The tool also includes one or more gamma-ray scintillation detectors that measure the amount of gamma-ray radiation from the formation and its energy spectrum as a function of time. The tool can also include one or more neutron detectors that measure the amount of thermal neutron radiation from the formation and its energy spectrum as a function of time. These measurements can give quantitative information that characterizes petrophysical properties of the formation (such as formation or bulk density, formation porosity, sigma or macroscopic thermal neutron capture cross-section of the formation, lithography, and water saturation).

Furthermore, the formation itself may contain materials that emit radiation naturally. In this case, the gamma-ray scintillation detector of the tool can be used to measure the spectrum of nuclear radiation (e.g., gamma-rays) emitted naturally by the formation. The measured spectrum (or background spectrum) can be used in order to discern petrophysical properties of the formation. The background spectrum can also be subtracted from the measured spectrum resulting from neutron bombardment of the formation in order to remove the effects of the naturally emitted gamma-rays from the measurement.

The gamma-ray scintillation detector of the nuclear well logging tool includes a scintillator coupled to an electronic light sensor such as a photomultiplier tube (PMT), photodiode, or silicon photomultiplier. A scintillator is a material that exhibits scintillation—the property of luminescence, when excited by an incident gamma-ray radiation. Luminescent materials, when struck by an incoming particle, absorb its energy and scintillate, (i.e. re-emit part of the absorbed energy in the form of light). Sometimes, the excited state is metastable, so the relaxation back down from the excited state to lower states is delayed (necessitating anywhere from a few nanoseconds to hours depending on the material). The process then corresponds to either one of two phenomena, depending on the type of transition and hence the wavelength of the emitted optical photon: delayed fluorescence or phosphorescence, also called after-glow.

A PMT absorbs the light emitted by the scintillator and re-emits it in the form of electrons via the photoelectric effect. The subsequent multiplication of those electrons (sometimes called photo-electrons) results in an electrical pulse which can then be analyzed and yield meaningful information about the particle that originally struck the scintillator. Thus, when gamma-ray radiation from the formation strikes the gamma-ray scintillation detector, the gamma-ray scintillation detector may generate an electrical signal corresponding to the energy of the incident gamma-ray radiation.

There are various properties of scintillator materials which may be beneficial to their use in gamma-ray scintillation detectors, such as high density, fast operation speed, low cost, radiation hardness, production capability and durability of operational parameters.

High density scintillator materials can reduce the size of the scintillation detector for high-energy gamma-rays. The range of Compton scattered photons for lower energy gamma-rays is also decreased with the use of high density scintillator materials. This results in high segmentation of the detector and leads to better spatial resolution. High density scintillator materials can also have heavy ions in the lattice (e.g., lead, cadmium), which can significantly increase the photo-fraction. The increased photo-fraction is relevant for some applications, such as positron emission tomography (PET). High stopping power for the electromagnetic component of the ionizing radiation needs greater photo-fraction, which may allow for a more compact detector.

Operating speed can affect the scintillators resolution of spectra. For example, high operating speed may be beneficial for improving resolution of spectra due to the avoidance of "pile-up". The energy measured in a single pulse becomes inaccurate if it piles up on the tail of a previous pulse. Therefore, it is preferable that, on average, the scintillation pulse decays before another pulse arrives. In addition, the signals may be time tagged, making a fast response preferable. For example, for certain types of measurements (e.g., "Sigma"), data is acquired in time histograms with time bins as short as 1 microsecond. Therefore, for example, it is preferable that detectors measuring Sigma have reasonably short response times of less than 1 microsecond.

Several other properties are also desirable for good scintillator material, including a high efficiency for converting the energy of incident radiation into scintillation photons, transparency to its own scintillation light (for good light collection), efficient detection of the radiation being studied, a high stopping power, good linearity over a wide range of energy, a short rise time for fast timing applications (e.g., coincidence measurements), a short decay time to reduce detector dead-time and accommodate high event rates, emission in a spectral range matching the spectral sensitivity of existing PMTs (although wavelength shifters can sometimes be used), and an index of refraction near that of glass ($\approx 1.5$) or sapphire to allow optimum coupling to the PMT window.

Among the properties listed above, the light output can affect both the efficiency and the resolution of the gamma-ray scintillation detector. The energy resolution is defined as the ratio of the full width, at half maximum, of a given energy peak to the peak position, usually expressed as a percentage. The light output is a strong function of the type of incident particle or photon and of its energy, which therefore strongly influences the type of scintillation material to be used for a particular application. The light output is often quantified as a number of scintillation photons produced per MeV of deposited energy. Typical numbers are (when the incident particle is an electron): $\approx 40,000$ photons/MeV for NaI(Tl), ~10,000 photons/MeV for plastic scintillators, and 8,000 photons/MeV for bismuth germanate (BGO). The presence of quenching effects results in reduced light output (i.e., reduced scintillation efficiency). Quenching refers to all radiationless de-excitation processes in which the excitation is degraded mainly to heat.

Various electronic neutron sources are used in logging tools for neutron bombardment of the formation, but are typically limited in strength due to constraints in size and power consumption. To compensate for limited neutron source strength available in logging tools noted above, the gamma-ray scintillation detectors of the nuclear logging tools for oilfield applications can benefit from having high detection efficiency. Detection efficiency of a detector can depend on different parameters. In that regard, various definitions of efficiency are used in the literature to relate some of those different parameters: (i) absolute efficiency is the ratio of the number of counts recorded by the gamma-ray scintillation detector to the number of gamma-rays emitted by the source (in all directions); (ii) intrinsic efficiency is the ratio of the number of pulses recorded by the gamma-ray scintillation detector to the number of gamma-rays hitting the gamma-ray scintillation detector; (iii) full-energy peak (or photopeak) efficiency is the efficiency for producing full-energy peak pulses only, rather than a pulse of any size, for the gamma-ray. As space within an oilfield measurement tool is limited, a detector package may also be limited in size (e.g., depending on application, approximately 13 to 76 mm diameter and 13 to 200 mm long), which may make achieving high detection efficiency more challenging.

The overall signal production efficiency of the gamma-ray scintillation detector, however, also depends in part on the quantum efficiency of the PMT (typically about 30% at peak for room temperature PMTs and about 20% for high temperature PMTs), and on the efficiency of light transmission and collection (which depends on the type of reflector material covering the scintillator and light guides, the length/shape of the light guides, any light absorption, etc.).

Further, other considerations for performance of the gamma-ray scintillation detector include the operating temperatures and vibration tolerance. The coupled PMTs also exhibit temperature sensitivity, and can be damaged if submitted to mechanical shock. In the case of oilfield use, a scintillator detector may experience a range of operating temperatures (e.g., $-40°$ C. to $175°$ C.), and high-vibration or shock. For many scintillators, light output and scintillation decay time depend on environmental temperature experienced by the scintillator. This dependence is often ignored for room-temperature applications (i.e., in a laboratory environment) since it is usually small over a small temperature range around room temperature.

The above-noted characteristics of scintillator materials and the range of downhole environmental conditions in which the gamma-ray scintillation detectors may operate have resulted in few choices of gamma-ray scintillation detectors.

Tl-activated Sodium Iodide (NaI(Tl)) has been used as a scintillator material in the gamma-ray scintillation detectors for some nuclear logging tools. The scintillation decay of NaI(Tl) is reasonably fast with a primary time constant of about 230 ns at room temperature ($25°$ C.). Also, the light yield of NaI(Tl) is also reasonably tolerant to temperature increases, making NaI(Tl) usable in a downhole environment to temperatures up to $175°$ C., and even up to $200°$ C. for certain applications.

Ce-activated Gadolinium Oxyorthosilicate (GSO) and self-activated Bismuth Germanate (BGO) have been used as scintillator materials in gamma-ray scintillation detectors for some nuclear logging tools. Both GSO and BGO are mechanically stronger and chemically more stable than NaI(Tl). In addition GSO and BGO are more efficient than NaI(Tl) for gamma-ray detection due to their higher density and higher effective atomic number ($Z_{eff}$). However, it is common for high atomic number materials other than NaI (Tl), such as GSO and BGO, to still exhibit low light yield even at room temperature [Kob2007] and/or for their light output to drop significantly with increasing temperature [Boa2013]. For example, BGO [Boa2013], bismuth silicate (BSO) [Kob1983], and lead tungstate (PWO or PbWO4) [Kob2007] each has a room temperature light yield of less than 1500 ph/MeV [Kob2007], except BGO which exhibits about 6,000 ph/MeV at room temperature [Kob2007]. These are the highest room temperature light yield values of high atomic number materials in the literature. However, BGO experiences rapidly decreasing light yield as temperature increases. For example, at $70°$ C., BGO's light yield is one-half of its light yield at room temperature.

The above-mentioned decrease in light output at higher temperatures causes the energy resolution to decrease at higher temperatures, which, in-turn reduces the signal-to-noise ratio and increases statistical uncertainty in the radiation measurements obtained by the scintillation detector. Thus, such temperature-sensitive scintillator materials, such as GSO and BGO, are deemed to be unsuitable (without auxiliary cooling of the scintillator detector) for use in scintillator detectors intended for use at temperatures above $150°$ C. for an extended time. Temperature limitations also apply to commercially available solid state gamma detectors (e.g. High Purity Germanium (HPGe) or Cadmium Zinc Telluride (CZT)), which are not used downhole.

Recently, Ce-activated Lanthanum Bromide (LaBr3) and Ce-activated Yttrium Aluminum Perovskite (YAP) have been used as scintillator materials in gamma-ray scintillation detectors for some nuclear logging tools, particularly for high count rate applications due to their decay times of less than 30 nanoseconds. However, Ce-doped LaBr3, is extremely sensitive to contaminants, even inside a hermetically sealed detector, and the sensitivity is exacerbated even more when the scintillator operates at elevated temperatures (i.e., above $70°$ C.).

While it is possible to employ work-arounds to avoid the aforementioned temperature effects on scintillator detectors, workarounds may be inconvenient and costly. For example, one workaround is to passively cool a scintillation detector by placing the detector in a Dewar flask. However, such cooling is time-limited and adds to cost and complexity of the tool.

Also, the light emission spectra of many commercial scintillator materials that are used under laboratory conditions are not favorable for use with PMTs typically used in oilfield scintillation detectors, which are mostly sensitive in the deep violet and ultra-violet (UV) range. Such commercial scintillator materials may thus require other PMTs, which can increase the complexity and cost of the scintillation detector.

SUMMARY

According to one aspect, further details of which are described below, a subsurface logging tool is provided that is deployable in a wellbore that traverses a formation. The logging tool includes a tool housing configured for movement within and along the wellbore, and a gamma-ray scintillation detector housed in the tool housing. The gamma-ray scintillation detector includes a thallium-based scintillator material that is suitable for high-temperature downhole environments (i.e., above 70° C.). As such, the thallium-based scintillator material improves the performance of oilfield measurement(s) at temperatures above 70° C. and at least up to 175° C., when compared with the use of the other aforementioned scintillator materials. The thallium-based scintillator material may be Ce-activated Thallium Lithium Yttrium Chloride (TLYC, Ce:TLYC), with the chemical formula of the host material being $Tl_2LiYCl_6$. The following description will refer to Ce:TLYC only by its host name TLYC to indicate that the activation may rely also on trace impurities and may be assisted by other activator elements. The gamma-ray scintillation detector may include other features described above, including a photomultiplier tube (PMT) as well as measurement electronics.

The scintillator material may have the chemical formula $Tl_2LiYi_{1-x}Ce_xCl_6$, where x is 0 to 1. Lithium (Li) may be partially or completely replaced by another alkali metal or by indium (In). Yttrium (Y) is partially or completely replaced by another rare earth element. Chlorine (Cl) is partially or completely replaced by another halide.

The operation of the gamma-ray scintillation detector may be specifically tailored to provide gain control by accounting for a secondary X-ray peak in the measured radiation spectrum, which has been found to accompany the gamma-ray emission peak detected from a stabilization source used in conjunction with the TLYC material. As will be described in further detail below, a gain control arrangement and method may include placing a radioactive source, such as a cesium (Cs) source with a well-defined gamma-ray energy, near the gamma-ray scintillation detector (e.g., within a housing of the tool) while X-ray and gamma-ray radiation emitted by or returning from the formation or the borehole is being detected. The gamma-ray peak from the stabilization source in the detected spectrum may thereafter be used as a reference for determining and stabilizing the gain of the gamma-ray scintillation detector.

The scintillator material used in the gamma-ray scintillation detector of the disclosed well logging tool may have an effective atomic number of at least sixty. The scintillator material may have a minimum light output of 4,500 ph/MeV when operating at a temperature up to 100° C. The scintillator material may have a minimum light output of 4,000 ph/MeV when operating at a temperature of 125 C. The scintillator material may have a minimum light output of 3,500 ph/MeV when operating at a temperature of 150 C. The scintillator material may have a minimum light output of 3,000 ph/MeV when operating at a temperature of 175 C. The scintillator material may have a minimum light output of 2,500 ph/MeV when operating at a temperature of 200 C.

The gamma-ray scintillation detector may be configured to measure naturally emitted radiation from a formation. Also, the scintillation detector may include a gamma-ray source configured to emit gamma radiation, and the tool may be configured to measure gamma-gamma density of a formation in which the tool is deployed. Also, the disclosed logging tool may include a neutron source that is configured to emit neutrons from the tool into the formation to induce gamma-rays, and the tool may be configured to measure the neutron induced gamma-rays from the formation.

The scintillator material may be formed of an undoped TLYC material. Also the scintillator material may be formed of a Ce-doped TLYC material, having a Ce concentration of 0.01% to about 100%. The scintillator may be in a crystalline or polycrystalline form.

The logging tool may include a voltage source coupled to the scintillation detector. The voltage source is configured to supply voltage to the scintillation detector. A gain of the scintillation detector may be stabilized based on a feedback signal to control the voltage supplied by the voltage source to the scintillation detector. Also, the logging tool may include a stabilization circuit that may be configured to receive the output of the scintillation detector and output the feedback signal to the voltage source. The feedback signal may be based on at least one of a photo peak and escape peak of a measured spectrum output by the scintillation detector.

The logging tool may include an event discriminator coupled to the scintillation detector. The event discriminator may be configured to analyze the output of the scintillation detector and implement pulse-shaped discrimination based on the output to distinguish between a gamma-ray event and a neutron detection event.

DETAILED DESCRIPTION

As used herein "borehole" refers to a wellbore, including an openhole or uncased portion of a well. Also, as used herein "drill string" refers to a combination of drillpipe, a bottomhole assembly including drill bit and logging tools, and any other tools used to make the drill bit turn at the bottom of the wellbore. Further, as used herein "formation" refers to rock around the borehole. In the context of formation evaluation, the term formation refers to the volume of rock seen by a measurement made in the borehole, as in a log or a well test. These measurements indicate the physical properties of this volume. Also, as used herein, the term "downhole" refers to locations below the surface in the borehole.

Figure 1:
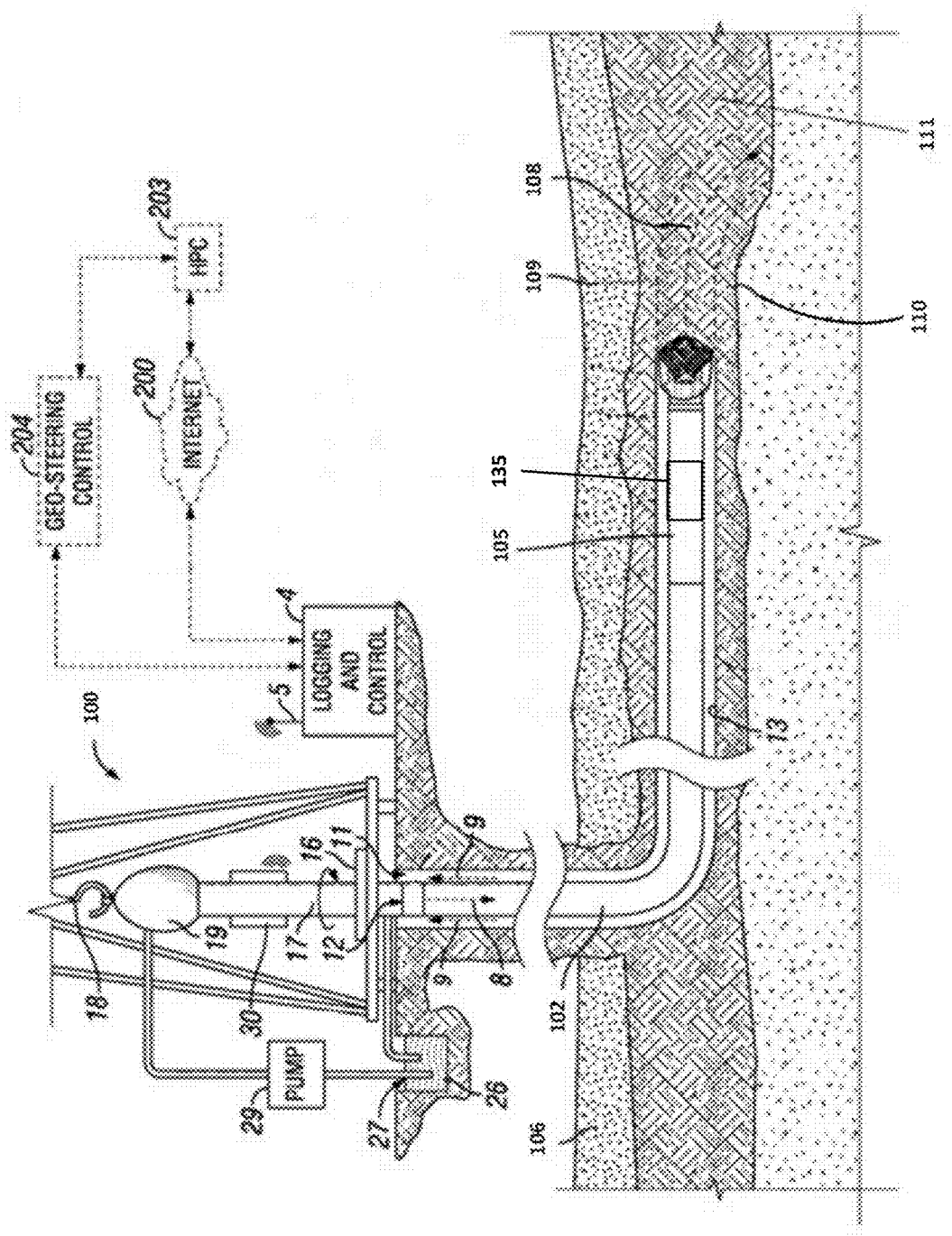
FIG. 1 is a schematic diagram of a wellsite that embodies an exemplary logging-while-drilling (LWD) system according to the present disclosure.

FIG. 1 illustrates a wellsite in which a disclosed downhole logging tool 135 can be employed. The wellsite can be onshore or offshore. In this exemplary system, a borehole or wellbore 11 is formed in a subsurface formation reservoir 111 by directional rotary drilling in a manner that is well known. A drill string 12/102 is suspended within the wellbore 11. A bottom hole assembly (BHA) 105 is rigidly coupled to the lower end of the drill string 102 and conveyed within the wellbore 11 by the drilling string 12/102. The BHA 105 includes a drill bit at its lower end. The surface system includes platform and derrick assembly 100 positioned over the wellbore 11, where the assembly 100 includes a rotary table 16, kelly 17, hook 18 and rotary swivel 19 that cooperate to impart rotary motion to the drill string 12/102 and the drill bit of the BHA 105. The upper end of the drill string 12/102 is rigidly connected to the kelly 17. The kelly 17 is rotated by the rotary table 16, energized by means not shown, which imparts rotary motion to the drill string 12/102 and the drill bit. The kelly 17 and drill string 12/102 are suspended from the rotary swivel 19, which is supported by the hook 18. The rotary swivel 19 permits rotation of the kelly 17 and drill string 12/102 relative to the hook 18. As is well known, a top drive system or downhole motor could alternatively be used.

The wellsite of FIG. 1 further includes drilling fluid or mud 26 stored in a pit 27. A pump 29 delivers the drilling fluid 26 to the interior of the drill string 12/102 via a port in the rotary swivel 19, causing the drilling fluid 26 to flow downwardly through the drill string 12 as indicated by the directional arrow 8. The drilling fluid 26 exits via ports in the drill bit of the BHA 105 and then circulates upwardly through the annulus region between the outside of the drill string 102/12 and the wall 13 of the wellbore 11, as indicated by the directional arrows 9. In this known manner, the drilling fluid 26 lubricates the drill bit and carries formation cuttings up to the surface. The formation cuttings can be removed from the drilling fluid before it is returned to the pit 27 for recirculation.

The BHA 105 includes a number of logging-while drilling (LWD) modules that operate together a part of a LWD tool, possibly one or more measuring-while-drilling (MWD) modules, and a roto-steerable system that controls the drilling direction of the drill bit. An example BHA 105 is shown in FIG. 2A. The LWD modules of the LDW tool can be housed in a special type of drill collar as is known in the art. The LWD modules of the LWD tool includes capabilities for measuring and storing electromagnetic response data that is sensitive to directional resistivity of the formation in the vicinity of the BHA 105. The MWD module(s) can also be housed in a special type of drill collar as is known in the art. The MWD modules includes capabilities for measuring, processing, and storing information that characterizes position and direction of the drill string 102 and the drill bit of the BHA 105 as well as other drilling measurements, such as a weight-on-bit, torque, and shock and/or vibration.

The BHA 105 also includes a downhole telemetry subsystem that communicates data signals and control signals between the components of the BHA 105 (including the LWD modules of the LWD tool) and a surface-located logging and control unit 4 via electronic subsystem 30. The downhole telemetry subsystem can employ a variety of telemetry methods, such as wired telemetry methods (e.g., drill pipe that incorporate telemetry cables or fiber optic cables) and wireless telemetry method (e.g., mud-pulse telemetry methods, electromagnetic telemetry methods, and acoustic telemetry methods). The downhole telemetry subsystem can also supply electrical power supply signals generated by a surface-located power source for supply to the components of the BHA 105. The BHA 105 can also include a power supply transformer/regulator for transforming the electric power supply signals supplied by the surface-located power source to appropriate levels suitable for use by the components of the BHA 105. In alternate embodiments, the BHA 105 can include an apparatus for generating electrical power for supply to the components of the BHA, such as a mud turbine generator powered by the flow of the drilling fluid. Other power and/or battery systems may be employed.

The wellsite of FIG. 1 can also include a surface-located logging and control unit 4 that interfaces to a remote (e.g., cloud-based) high performance computer center 203 via data communication links (shown as bidirectional dotted lines with arrows) to a network such that the Internet 200. A geo-steering control module 204 can interface to the logging and control unit 4 and to the high-performance computer center 203 via data communication links (shown as bidirectional dotted lines with arrows). The data communication links between the surface-located components can utilize wired and/or wireless connection via one or more communication lines. The communication topology between these surface-located components can be point-to-point, point-to-multi point or multipoint-to-point. The wired connection(s) can employ a variety of cable types or wires using diverse wired protocols (serial, wired Ethernet, fiber channel, etc.). The wireless connection(s) can employ a variety of diverse wireless protocols (such as IEEE 802.11, Bluetooth, Zigbee, or any non-standard RF or optical communication technology).

The high-performance computer center 203 can be configured to perform the spectral analysis and measurements as described herein, which are used to characterize the formation during drilling. The methods, techniques, and systems disclosed can enhance the ability to characterize a formation during drilling operations. Furthermore, the methods, techniques, and systems disclosed herein can be used as part of post-drilling analysis and model refinement for improved reservoir characterization.

Figure 2:
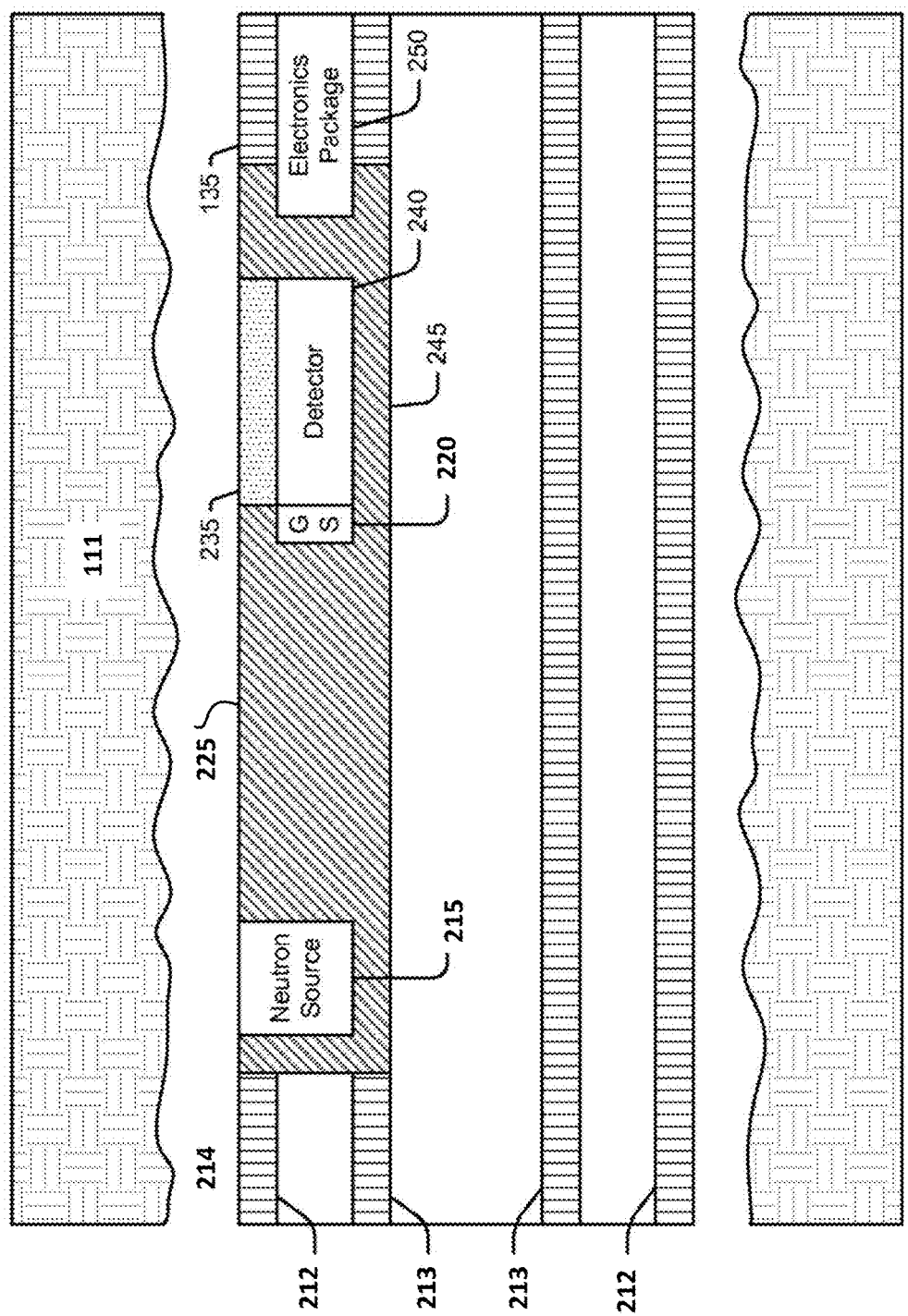
FIG. 2 shows a schematic cross-section of a logging tool of the LWD system.

The LWD modules of the BHA 105 may include a nuclear well logging tool 135, which is illustrated schematically in cross-section in FIG. 2. The nuclear well logging tool 135 includes a housing 225 disposed between an outer shell 212 and an inner shell 213. The logging tool 135 also includes a neutron source 215, a gamma-ray scintillation detector 240, a gamma-ray source 220 (which can be used for gain stabilization of the gamma-ray scintillation detector 240), and an electronics package 250, which are all housed in the housing 225. The nuclear well logging tool 135 is conveyed along the wellbore 11 by the drill string 102/12 in order to obtain measurements of the formation in the vicinity of the tool 135 as described below.

The neutron source 215 is configured to emit neutrons that penetrate into and thus bombard the formation 111. Such neutrons can interact with nuclei in the formation 111 to produce gamma-ray radiation. Such gamma-rays can return back to the tool 135 and pass through the window 235 to the gamma-ray scintillation detector 240. While the neutron source 215 is shown in the tool 135, depending on the type of logging being performed, the neutron source 215 may not be used. For example, when the logging tool 135 is used to measure natural gamma-ray radiation emitted by the formation, and not induced by neutron bombardment of the formation, the neutron source may not be used. In that case, the naturally-occurring gamma-ray radiation emitted by the formation 111 may still reach the gamma-ray scintillation detector 240 through the window 235. The nuclear well logging tool 135 can also include other components (such as a neutron detector and/or gamma-ray source) that are well known and not shown for the sake of simplicity of the description.

As noted above, the gain of the gamma-ray scintillation detector 240 may drift with the temperature. To aid in stabilizing the gain of the gamma-ray scintillation detector 240, the gamma-ray source 220 (also referred to herein as a stabilization source 220) may be placed very close to (e.g., adjacent) the gamma-ray scintillation detector 240. The stabilization source 220, which may be a radioactive material such as $^{137}$Cs, emits a very well understood spectrum of gamma-ray radiation which can be compared against output measurements of the gamma-ray scintillation detector 240 to correct and stabilize the gain, as described in greater detail below. The stabilization source 220 may be placed inside a housing (not shown) of the gamma-ray scintillation detector 240. The stabilization source 220 can be configured such that the emission of gamma-rays into the formation 111 is prohibited or minimized, which can thus reduce the effect on the scattered radiation detected as a result of the neutron bombardment of the formation by the neutron source 215. Instead, the stabilization source 220 can be configured to emit gamma-ray radiation primarily at the gamma-ray scintillation detector 240 to stabilize the gain of the gamma-ray scintillation detector 240, as will be described in greater detail below.

In the embodiment of the logging tool 135 shown in FIG. 2, the gamma-ray scintillation detector 240 can be shielded by a shield 245 and the tool 135 includes an electronics package 250 that may process signals produced by the gamma-ray scintillation detector 240. As described in greater detail below, the gamma-ray scintillation detector 240 includes a scintillator 240A (FIG. 3), which can emit photons of light when it receives gamma-ray radiation. The electronics package 250 processes the photonic signal emitted from the gamma-ray scintillation detector 240.

Figure 3:
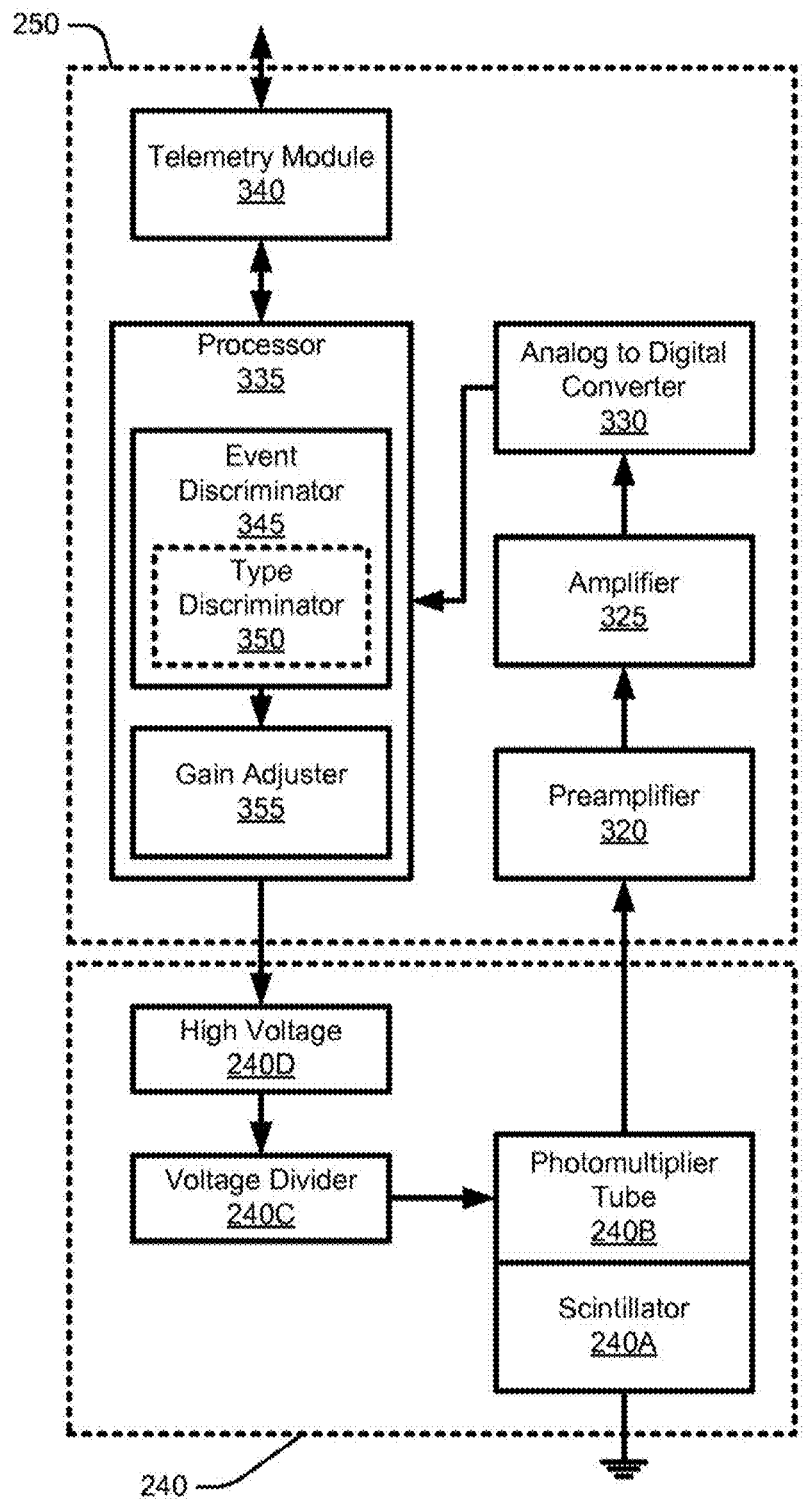
FIG. 3 shows a block diagram of an electronics package and detector of the logging tool in FIG. 2.

FIG. 3 illustrates further details of the electronics package 250 and the gamma-ray scintillation detector 240 shown in FIG. 2. As illustrated in FIG. 3, the gamma-ray scintillation detector 240 may include the scintillator 240A and a photomultiplier tube ("PMT") 240B that is coupled to the scintillator 240A. The PMT 240B may be coupled to a voltage divider 240C and a high voltage source 240D. The high voltage source 240D may be coupled to the PMT 240B through the voltage divider 240C so that the output of the high voltage source 240D can be used to control the gain of the PMT 240B, as described in greater detail below.

The PMT 240B receives photons emitted by the scintillator 240A and, in-turn, generates a current pulse for each gamma-ray that strikes the scintillator 240A. The magnitude of the current pulse is related to the energy of the impacting gamma-ray. In one embodiment, the PMT 240B may be replaced by another type of photodetector that produces a current pulse, or, with appropriate adjustments to the other circuitry described herein, a voltage pulse, for each gamma-ray that strikes the scintillator 240A.

In the embodiment shown in FIG. 3, the PMT 240B is coupled to a preamplifier 320. The preamplifier 320 converts current pulses in the PMT 240B arising from radiation entering the scintillator 240A to voltage pulses. An amplifier 325 is coupled to the output of the preamplifier 320 and may provide adjustable amplification of the signal from the preamplifier 320. The adjustable amplification combines an adjustable attenuator with an amplifier. In another embodiment, amplification of the amplifier 325 may be directly adjustable.

The output of the amplifier 325 is a series of voltage pulses. Each voltage pulse corresponds to the impact of the gamma-ray radiation on the scintillator 240A, and the amplitude of each voltage pulse corresponds to the energy deposited (or generated) in the scintillator 240A by the gamma-ray radiation that initiated the pulse. An analog-to-digital converter ("ADC") 330 is coupled to the output of the amplifier 325. The ADC 330 samples the signal produced at the output of the amplifier 325 and converts it to digital data representative of the sampled signal.

A processor 335 receives the digital data produced by the ADC 330 and processes such digital data to obtain a gamma-ray spectrum representative of the count of the detected gamma-rays in different channels (where the channels based on pulse magnitude or height of the detected gamma-rays). Note that neutrons incident on the scintillator 240A can produce photons and corresponding electrical pulses that are part of the sampled signal output from the amplifier 325 and thus part of the digital data produced by the ADC 330. In this case, the processor 335 can implement a pulse type discriminator 350 that discriminates between the electrical pulses produced by gamma-rays and the electrical pulses produced by neutrons. The pulse type discriminator 350 can employ a pulse shape discrimination algorithm as is well known in the art. The processor 335 can also implement a gain adjuster 355 that adjusts the gain of the gamma-ray scintillator detector 240 as described below.

The gamma-ray spectra obtained by the processor 335 over time can be communicated to the surface-located HPC 203 by the telemetry module 340. The HPC 203 can store and process such gamma-ray spectra obtained by the LWD tool 135 to give quantitative information that characterizes petrophysical properties of the formation (such as formation or bulk density, formation porosity, sigma or macroscopic thermal neutron capture cross-section of the formation, lithography, and water saturation) as a function of well depth or location in the formation. Such information can be stored and displayed as part of a log of petrophysical properties as a function of well depth or location in the formation.

With regard to PMTs, PMTs are commonly used for detecting weak light levels. A PMT typically consists of a photosensitive cathode, a chain of secondary emission electrodes called dynodes and an output electrode called an anode with electric potentials arranged between them.

The operating principle of a PMT is as follows. Light flux hits the cathode which converts light photons into free electrons. The applied voltage directs the free electrons to the first dynode. One electron liberates several secondary electrons from the first dynode in a process called secondary emission. These secondary electrons are in-turn directed to the next dynode where the secondary emission process also happens. These steps are repeated on every dynode.

The gain of a photomultiplier is defined as the ratio of the anode current to the cathode current. The gain is typically from $10^2$ to $10^8$ depending on the number of dynodes, the interdynode voltages, and the dynode materials. Preferably, the gain should remain stable during the operation in order to yield ideal performance for the light detecting device. Unfortunately, this is not usually achieved because the gain of the PMT tends to drift with the operating temperature of the PMT, with variable light fluxes, and with ageing of the PMT.

Figure 5:
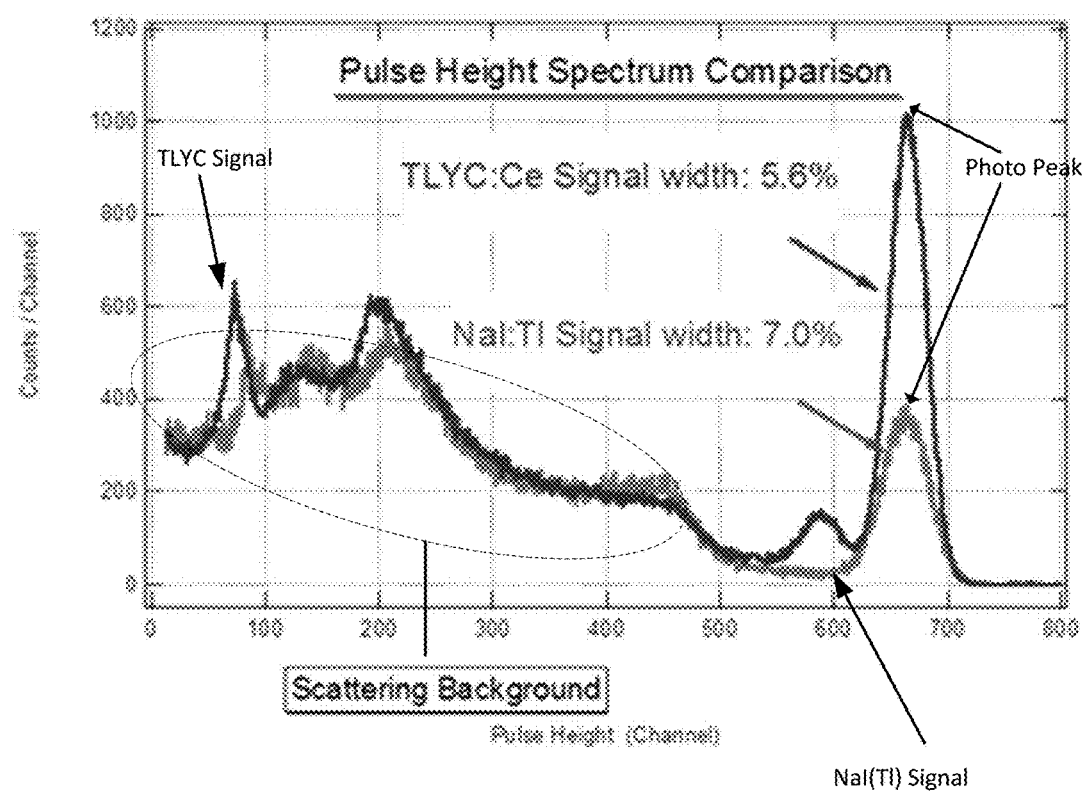
FIG. 5 shows a plot of experimental spectra measured using two different scintillator materials.

As noted above, the housing of the gamma-ray scintillation detector 240 can include a stabilization source 220 with a known gamma-ray energy (e.g., $^{137}$Cs has a full energy peak at 662 keV as shown in FIG. 5) to emit gamma-ray radiation at the scintillator 240A so that the spectrum of the stabilization source 220 can be measured along with the gamma-ray measurements of the formation 111. Specifically, a spectral standard for the stabilization source 220 (which is representative of the count of detected gamma-ray pulses in different channels as emitted from the stabilization source 220) can be measured and stored in computer memory accessible to the processor 335. The processor 335 can access this spectral standard and use it as a reference to compare to the measured gamma-ray spectrum from the formation 111. Specifically, deviation between the gamma-ray peak of the stabilization source 220 in the measured spectrum obtained from the formation 111 relative to the gamma-ray peak of the stabilization source 220 in the predefined spectral standard for the stabilization source 220 may be used by the gain adjuster 355 to generate a feedback signal to the high voltage source 240D to adjust the voltage input to the PMT 240B, which will, in-turn, affect the gain of the gamma-ray scintillation detector 240. Also, as will be described in greater detail below, owing to the unique characteristics of the disclosed scintillator 240A, an additional X-ray escape peak can be present in both spectral standard and the measured gamma-ray spectrum from the formation. In this case, the combination of the X-ray escape peak and the gamma-ray peak associated with the stabilization source 220 (or the X-ray escape peak alone) can be used to stabilize the gain of the gamma-ray scintillation detector 240.

Figure 9:
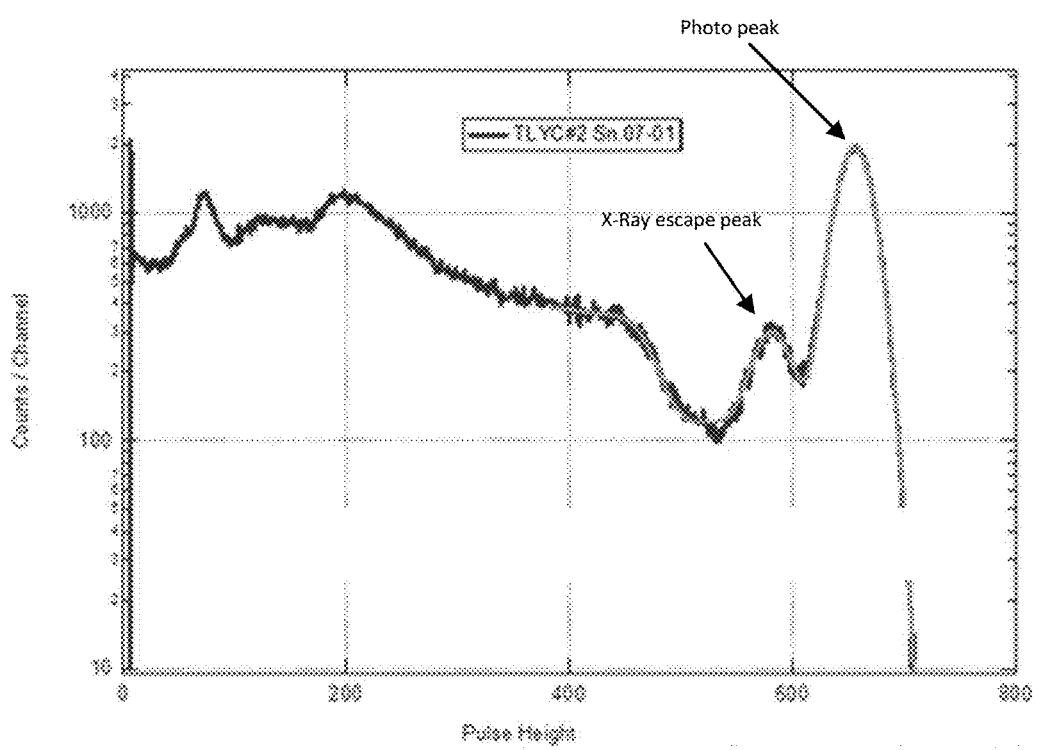
FIG. 9 shows a pulse height spectrum of $^{137}Cs$ gamma-rays acquired with a thallium-based scintillation detector, in accordance with an aspect of the disclosure.

As noted above, the amplitude of each voltage pulse processed by the electronics package 250 corresponds to the energy deposited (or generated) in the scintillator 240A by the gamma-ray radiation that initiated the voltage pulse. A histogram of such voltage pulses can be made to show "counts" of the voltage pulses at various magnitudes or amplitudes. A range of pulse magnitudes can be grouped in channels. Such a histogram of counts is termed a "spectrum", such as that shown in FIGS. 5 and 9. The histogram can include counts caused by multiple radiation sources (e.g., backscattered radiation from the formation 111 and stabilization source 220). In the case of the stabilization source 220, however, its energy level can be chosen to be much higher than the expected backscattered energy from the formation 111, so that the counts associated with the stabilization source 220 can be somewhat isolated in the measured data. When the stabilization source 220 irradiates the scintillator 240A by emitting gamma radiation, the scintillator 240A absorbs and converts the received energy primarily into photons which have a large amplitude (energy) and large number of counts at such high amplitude (high resolution) relative to the energy and counts of the backscattered energy from the formation, as shown in FIGS. 5 and 9. As a result of the large amplitude and large counts, when plotted in histogram form, the photon-related data appears as a peak, which can be termed the full energy peak or photo peak of the detected gamma rays.

Furthermore, in embodiment(s), the energy of the chosen stabilization source 220 (e.g., $^{137}$Cs) can be a well-known characteristic of the stabilization source 220 and considered invariant. In this, its spectrum can be used as a model or standard that can be superimposed on the measured data of the tool 135 to correct all of the spectral data measured. For example, it is expected that the photo peak of a $^{137}$Cs source will be located at 662 keV. Therefore, if the measured data of the spectrum shows that the photo peak is shifted higher or lower in energy, this infers that the gain of the tool 135 has shifted by the difference between the standard energy value of the photo peak and the measured energy value of the photo peak.

Furthermore, for Tl-based scintillator material, it is possible that some energy of the gamma ray impinging onto the scintillator 240A may be exciting the core of a Ti atom and thus be converted by the scintillator 240A into a lower energy X-ray. The X-ray can escape the scintillator 240A leaving only a fraction of the total gamma energy to produce photons that results in voltage pulses at the output of the scintillation detector 240. The count of these voltage pulses, which are lower than the full energy peak, is part of the gamma-ray spectrum derived from the output of the scintillation detector 240 and referred to as an X-ray escape peak. The relative intensity of the X-ray escape peak with respect to the full energy peak is a characteristic of the Tl-based scintillator material and the geometry of the scintillator and does not change during logging measurements. In this case, characteristics of the X-ray escape peak and the photo peak (such as count ratio and channel spacing) or characteristics of the X-ray peak alone (such as count number and channel of the X-ray escape peak) in the measured gamma-ray spectrum from the formation can also be used to measure a shift in the gain of the gamma-ray scintillation detector 240 and to correct for such a gain shift with respect to the predefined spectral standard. For example, a change in the channels (or energy values) for the photo peak and the X-ray escape peak between the predefined spectral standard and the measured gamma-ray spectrum from the formation can be used to measure a shift in the gain of the gamma-ray scintillation detector 240 and to correct for such a gain shift. Alternatively, since two peak positions can be extracted when the X-ray escape is present instead of only one when only the full energy peak is available, an additional parameter, such as a channel offset or the detector non-linearity, can be determined. Thus, the additional X-ray escape peak can be used to obtain an overall better gain stabilization by averaging the gain shift from the two measurements (experimental versus standard for X-ray peak and full energy peak). Moreover, the additional X-ray escape peak allows one peak (X-ray or full energy peak) to be used to determine a gain factor, while the other peak can be used to determine another parameter in the energy calibration, such as channel offset or detector non-linearity.

As noted above, the scintillator 240A is a material that can emit photons in response to being impacted by gamma-ray radiation (or possibly neutron radiation). The disclosed scintillator 240A is a thallium-based high-temperature scintillator material, which may be in crystalline or non-crystalline form. While thallium-based scintillators for room temperature applications have been described in U.S. Patent Application Publication No. US 2016/0291169, published on Oct. 6, 2016, it has now been found that thallium-based scintillators also exhibit suitable light use in a downhole gamma-ray scintillation detector throughout a temperature range of at least −40° C. to 200° C.

Preferably, the disclosed Tl-based scintillator material uses Ce-activated Thallium Lithium Yttrium Chloride (TLYC, Ce:TLYC), having the chemical formula of the host material of $Tl_2LiYCl_6$. The following description will refer to Ce:TLYC as "TLYC" to indicate that the activation of the host material may rely also on trace impurities and may be assisted by activator elements other than cerium (Ce).

While $Tl_2LiYCl_6$ is preferred, it is understood that a number of materials from the family of elpasolites, which are similar to TLYC, may also be suitably used for scintillator materials for downhole detectors.

The TLYC material formula may be represented more generally in formula (1), below:

$$Tl_2MAX_6 \qquad (1)$$

where "Tl" is thallium;
where "M" is an alkali metal (e.g., Lithium (Li), Sodium (Na), Potassium (K), Rubidium (Rb), or Cesium (Cs) or Indium (In));
where "A" is a rare earth element (e.g., Yttrium (Y), Lanthanum (La), Praseodymium (Pr), Neodymium (Nd), Samarium (Sm), Europium (Eu), Gadolinium (Gd), Terbium (Tb), Dysprosium (Dy), Holmium (Ho), Erbium (Er), Thulium (Tm), Ytterbium (Yb), or Lutetium (Lu)); and
where "Ha" is a halide (e.g., chlorine (Cl) (e.g., Fluorine (F), Bromine (Br), or Iodine (I)).

Thus, examples of alternate scintillator materials in accordance with formula (1) and the foregoing substitutions include Thallium Lithium Yttrium Bromide (TLYB), Thallium Lithium Lanthanum Chloride (TLLC), Thallium Lithium Lanthanum Bromide (TLLB), or blends of those materials or similar materials that replace one of the constituents with small amounts of another element. It is also understood that an actual measurement of the ratio of elements (e.g., T:L:Y:C) may not be exactly 2:1:1:6, and that small fluctuations are possible in the material preparation and in the analysis.

It is also possible to dope the disclosed scintillator material with activators, or optically active elements. An activator "Dp" can substitute "A" in the matrix, and its concentration may range from 0% to 100%, as shown below in Formula 2.

$$Tl_2MA_{1-x}Dp_xHa_6 \qquad (2)$$

where "Dp" is a rare earth material (e.g., Cerium (Ce), Praseodymium (Pr), Neodymium (Nd), Europium (Eu), Gadolinium (Gd), Terbium (Tb), or Dysprosium (Dy)) and where "x" is a number between 0 and 1.

Additional doping (e.g., Strontium (Sr), Calcium (Ca), Barium (Ba), Magnesium (Mg), or Cadmium (Cd)) may also be used to improve properties such as stability and other properties not directly related to the scintillation.

In a more specific embodiment, the TLYC material formula may be represented in formula (3), below:

$$Tl_2LiY_{1-x}Ce_xCl_6 \qquad (3)$$

where "x" is a number between 0 and 1.

Some material properties of TLYC and the above-mentioned scintillator materials are shown in Table 1, below, for comparison.

TABLE 1

|  | TLYC | NaI | BGO | GSO | LaBr |
|---|---|---|---|---|---|
| Density (g/cm3) | ~4.6 | 3.67 | 7.13 | 6.71 | 5.3 |
| Atomic mass of heaviest element | 204.38 (Tl) | 126.90 (I) | 208.98 (Bi) | 157.25 (Gd) | 138.91 (La) |
| Effective atomic mass $Z_{eff}$ | 70.3 | 50.8 | 75.2 | 59.5 | 46.9 |
| Radiation Length X0 (cm) | 1.77 | 2.59 | 1.12 | 1.38 | 1.88 |

Also, some scintillation properties of Ce-doped TLYC and other scintillator materials are shown in Table 2, below, for comparison.

TABLE 2

|  | TLYC | NaI | BGO | GSO | LaBr |
|---|---|---|---|---|---|
| Dopant | Ce | Tl | — | Ce | Ce |
| Light output (1000 ph/MeV) | 30 | 40 | 6 | 9 | 61 |
| Energy resolution at 662 keV (%) | 4.8 | 7.1 | 9.1 | 7.8 | 2.8 |
| Emission peak (nm) | ~430 | 415 | 480 | 430 | 370 |

As noted above, neutron-gamma spectroscopy can be used to measure geochemistry and other formation properties downhole. In taking this measurement, the neutron source 215 can be used to excite characteristic gamma-rays of certain elements in the formation 111. The elements in the formation 111 can then be identified by their characteristic gamma-rays. However, the characteristic gamma-rays emitted by the excited elements are affected by scattering and absorption on their path to the tool 135 before being detected. This attenuation and spectral change may be due to interactions in the formation 111, borehole 11, or tool 135.

In practice, the measured gamma-ray spectrum measured by the gamma-ray scintillation detector 240 is considered a linear combination of standard spectra (spectral standards) of each element after certain corrections to the measurement are applied. The corrections fall into two categories: those that are dependent on external (with respect to the tool) environmental parameters such as density, porosity or borehole effects; and those that affect the detector response directly, which are material properties, electronics effects, and temperature. It is therefore advantageous that the detector response for each element is unique, (i.e. the standards used in the analysis are nearly orthogonal), so that the correlation between different standards is small. It is also advantageous that the response with temperature does not change much, or at least very predictably so that it may be corrected for in the analysis.

As shown above in Table 1, TLYC has a superior (larger) effective atomic number ($Z_{eff}$) compared to most (with the exception of BGO) of the scintillator materials discussed above that are used in the oilfield downhole environment. Indeed, thallium (Tl) is, after bismuth (Bi) and lead (Pb), the naturally occurring element having the highest atomic number that is not radioactive. An advantage of using TLYC is that the high $Z_{eff}$ and the high density of TLYC, as shown in Table 1, make the elemental standards for TLYC more unique than those for many of the other scintillator materials, including NaI(Tl), and, therefore less covariant. This leads to better accuracy and precision of the spectral processing for TLYC based detectors compared to, for example, NaI(Tl)-based scintillation detectors. In cases where MeV gamma rays have to be detected in a downhole tool, the detector size is generally suboptimal. Under such circumstances, TLYC is at least twice as efficient as compared to a NaI(Tl) scintillator of the same size. The efficiency improvement is a direct consequence of the higher effective atomic number ($Z_{eff}$) and the higher density of TLYC compared to that of NaI(Tl), as discussed above.

The use of the Tl-based scintillator material in a downhole environment is a significant advantage over the use of traditional high-Z materials discussed above, which all experience light output below 3000 ph/MeV at temperatures above 70° C. For example, BGO is used in downhole tools only in combination with a bulky Dewar flask. In various embodiments, the thallium-based TLYC material used in scintillator 240A can be used indefinitely in the high temperature (i.e., above 100° C.) down-hole environment without passive cooling (e.g., Dewar) mentioned above. For example, TLYC has a light output of at least 4,500 ph/MeV up to 100° C., 4,000 ph/MeV at 125° C., 3,500 ph/MeV at 150° C., 3,000 ph/MeV at 175° C., and 2,500 ph/MeV at 200° C. Thus, the TLYC scintillator material can improve the performance of oilfield spectra measurements at temperatures above 70° C. and at least up to 175° C., when compared with the other scintillator materials noted above that have been used in oilfield gamma-ray detectors.

Figure 4:
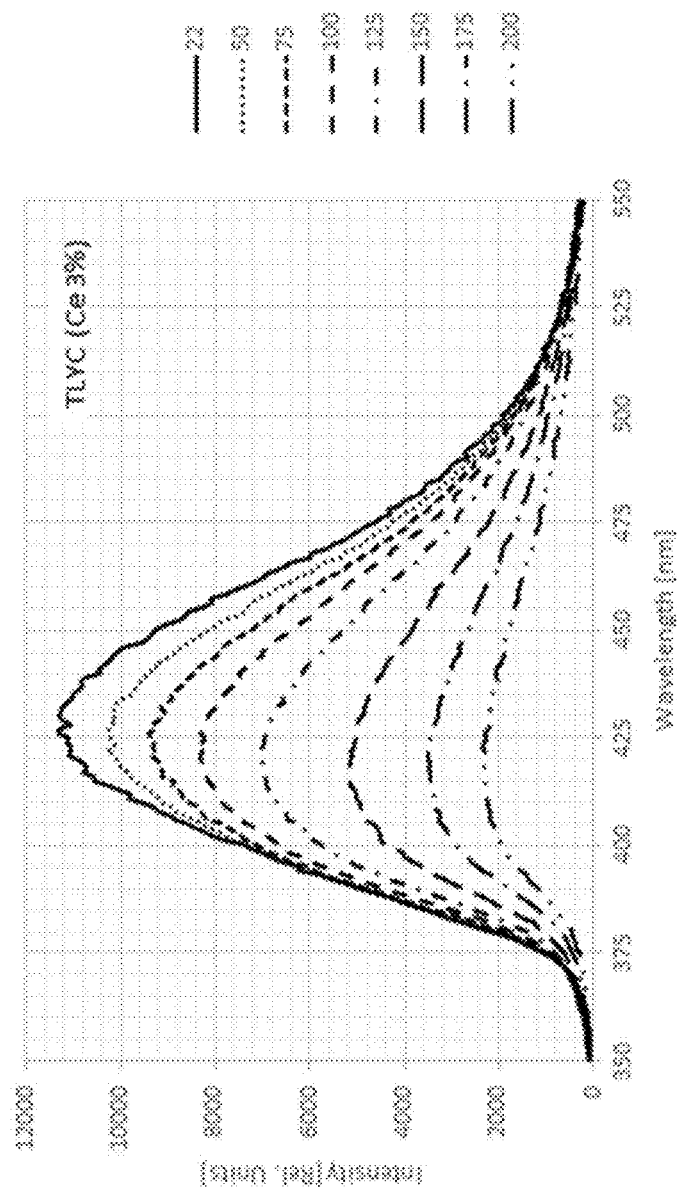
FIG. 4 shows a plot of light emission from a scintillator sample at various experimental temperatures.

Another characteristic of using TLYC as a scintillator is that the TLYC emission spectrum peaks around 430 nm (See, e.g., Table 2 and FIG. 4), which is better suited for standard high-temperature PMTs used in downhole logging tools than BGO. FIG. 4 shows plots of intensity as a function of wavelength for a TLYC sample with a 3% Ce concentration that is excited by X-rays while the sample is at various temperatures. Specifically, spectra of light emission excited by X-rays (radioluminescence) are shown for each of the tested temperatures of the sample. The sample contained 3% Ce with respect to the total rare-earth content. The slight shift to the blue in the maximum of emission from about 430 nm at room temperature to about 420 nm at 200° C. is advantageous because it improves the match with the high temperature PMT cathode mentioned above. On the other hand, for example, the emission spectrum of BGO peaks around 480 nm, which could require a special PMT having extended sensitivity at longer wavelengths. Such a special PMT can be irreversibly damaged when exposed to high temperatures. Also, unlike BGO, TLYC does not require a bulky Dewar to extend the time at which the detector can be operated at higher temperatures.

TLYC also is advantageous for downhole use owing to its energy resolution at elevated temperatures. For example, as shown in FIG. 5, TLYC features better energy resolution than most other scintillator material of the same size, such as NaI(Tl), Ce-doped GSO or BGO, and maintains this advantage at temperatures above 70° C.

With regard to BGO, for example, while BGO features both higher $Z_{eff}$ and higher density compared to TLYC, and the radiation length of BGO is shorter compared to TLYC, one advantage of using TLYC as a scintillator material is that a detector using a TLYC scintillator material features much better energy resolution than BGO. This compensates largely for the lower efficiency of TLYC relative to BGO in measurements like spectral gamma-ray measurements. Also, in that regard, while TLYC is less dense than GSO, GSO has a lower effective atomic number, and the radiation length of GSO is slightly shorter than for TLYC. Notably, TLYC has much better energy resolution than GSO, and, as a consequence, for the same size scintillator crystal, the performance of TLYC performs better than GSO in the precision of a spectral gamma-ray (SGR) measurement.

Figure 6:
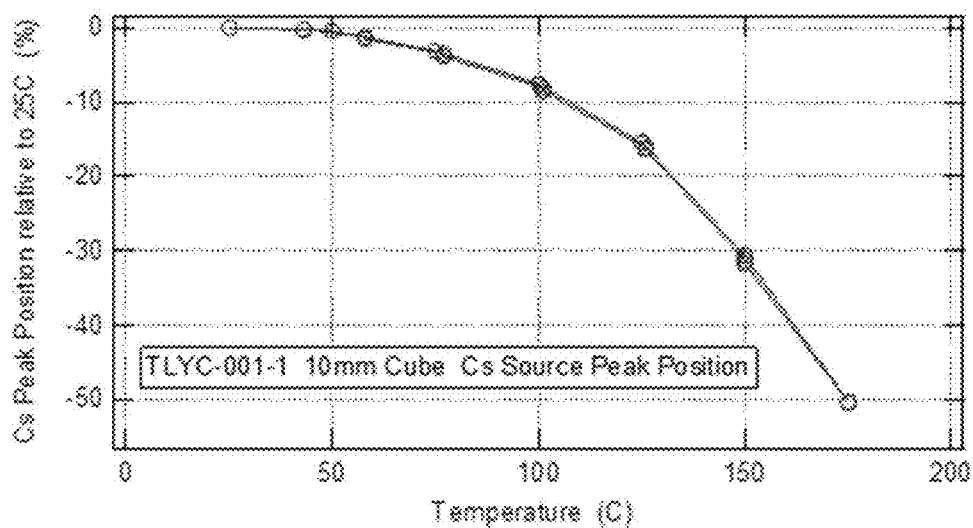
FIG. 6 shows a plot of relative photo peak position versus temperature for a scintillator sample.

Further, with regard to temperature effects on scintillator performance, FIG. 6 shows a graph of the light output change with temperature for an approximately 1 cm³ TLYC sample with a 3% Ce activator dopant concentration. The light output was assessed on a light guide setup by the change in the peak position of the Cs-137 full energy peak. The sample crystal was located on a light guide which was connected to a room temperature PMT. The sample TLYC crystal was then heated to a certain test temperature and left to stabilize for about one hour. Cs spectra were acquired by known methods and a photo peak was fitted by a Gaussian function to accurately determine its position. The peak position, as a proxy of light yield, was then plotted against temperature. The light yield at room temperature has been determined in comparison with NaI(Tl) for reference to be at least 24,000 ph/MeV. As shown in FIG. 6 the light yield for the sample crystal in the testing dropped to about 68% at 150° C. and about 50% at 175° C. When taking into account the respective settings of the shaping time on the light guide test setup and on the Multi-Channel Analyzer setup for spectral comparison, light yield results can be estimated from FIG. 6. These results correspond to a light yield of at least 8,100 ph/MeV at 150° C. and at least 6,000 ph/MeV at 175° C. for this particular tested TLYC crystal.

Also, in comparison to the above-mentioned GSO and BGO, the performance of the TLYC sample up to 175° C. is better than for GSO and BGO at only moderately elevated temperatures. In particular, GSO is essentially unusable at temperatures above 150° C., and BGO is essentially unusable at temperatures above 70° C., whereas TLYC is still usable at temperatures of up to at least 175° C. A higher temperature range for a tool allows it to be used in the downhole oilfield environment without the need for additional cooling arrangements, such as the passive cooling mentioned above (e.g., Dewar). In that regard, use of the TLYC crystals as scintillator materials may permit the use of gamma-ray scintillation detectors in MWD and LWD applications, where the use of passively cooled detectors limits their use due to holding time (LWD measurements may take days instead of hours in wireline) and vibration sensitivity.

Figure 7:
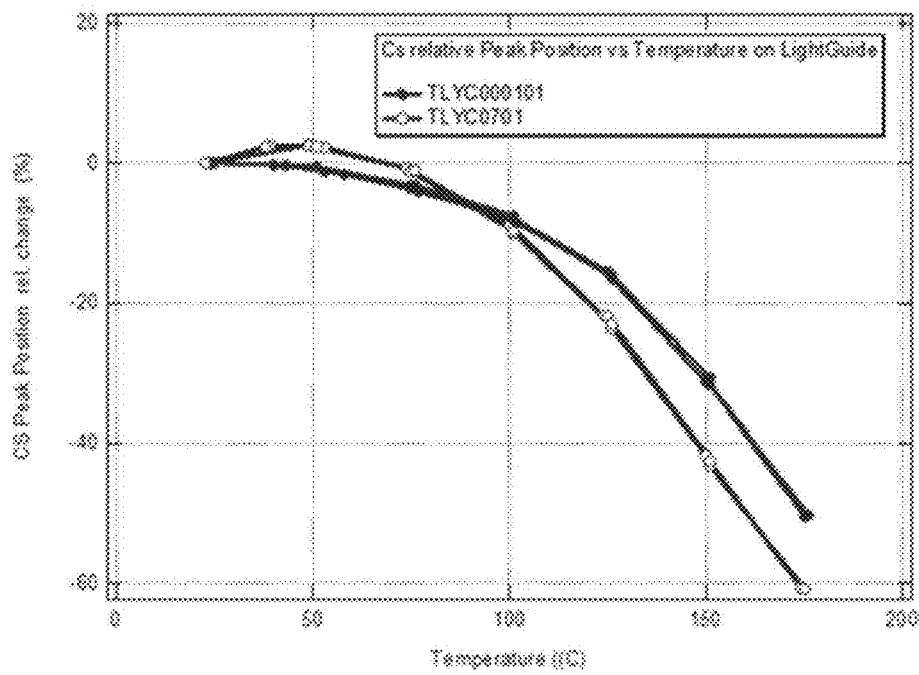
FIG. 7 shows a plot of relative photo peak position versus temperature for two scintillator samples with different dopant concentrations.

The effect on light yield with different Ce dopant concentrations was also tested for TLYC scintillator crystals used as scintillator 240A. The results of testing the various dopant concentrations on TLYC crystals is shown in FIG. 7 and Table 3, below.

TABLE 3

| Ce Concentration (%) | Estimated Light Yield (ph/MeV) |
| --- | --- |
| 0 (trace amounts) | 18 |
| 0.5 | 27 |
| 3 | 27 |
| 5 | 32 |
| 9 | 26 |

The experimental results indicate that the light yield (LY) dependence on dopant concentration is weak once a minimum concentration of about 0.5% Ce is reached. In FIG. 7 data is shown for two different samples of TYLC crystals, one sample with a 3% Ce concentration and another sample with a 2% Ce concentration. The fitted curves associated with the data for each TLYC sample show slight differences in the relative light yield with temperature. However, overall, both samples show a reduction of light yield with increasing temperature that is still suitable for use in a downhole scintillation detector, even though the reduction in light yield is greater than for a comparable NaI(Tl) scintillator that is commonly used in downhole scintillation detectors. Note, that the Ce concentration is measured with respect to the total rare earth (in this case the sum of Y and Ce) in the composition. Also, as Ce replaces Y, there is no drop in $Z_{eff}$ even at high Ce concentrations. The Ce activator concentration can therefore be varied to meet other specific needs for a given application such as light yield at high temperature, decay time, and effective atomic number.

For gamma-ray scintillation detectors, the response time is based on the scintillator decay time, which is typically in the nanosecond to microsecond range, and which is a property of a scintillator material used in the gamma-ray scintillation detector. Short decay times are important for avoiding pulse pile-up in high count rate applications and for the measurement of time intervals.

Figure 8A:
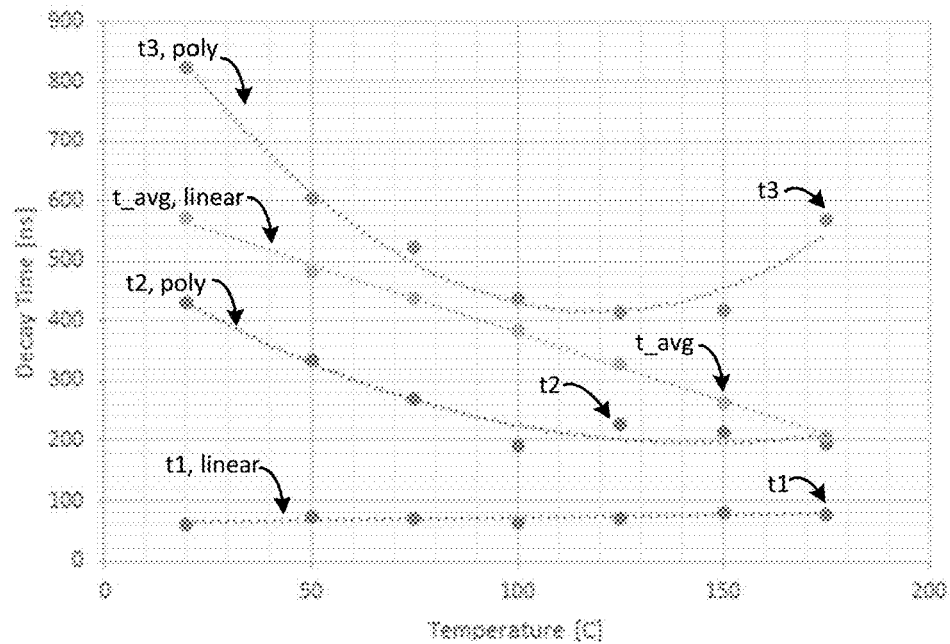
FIG. 8A shows a plot of scintillation decay times for a thallium-based scintillator versus temperature.
Figure 8B:
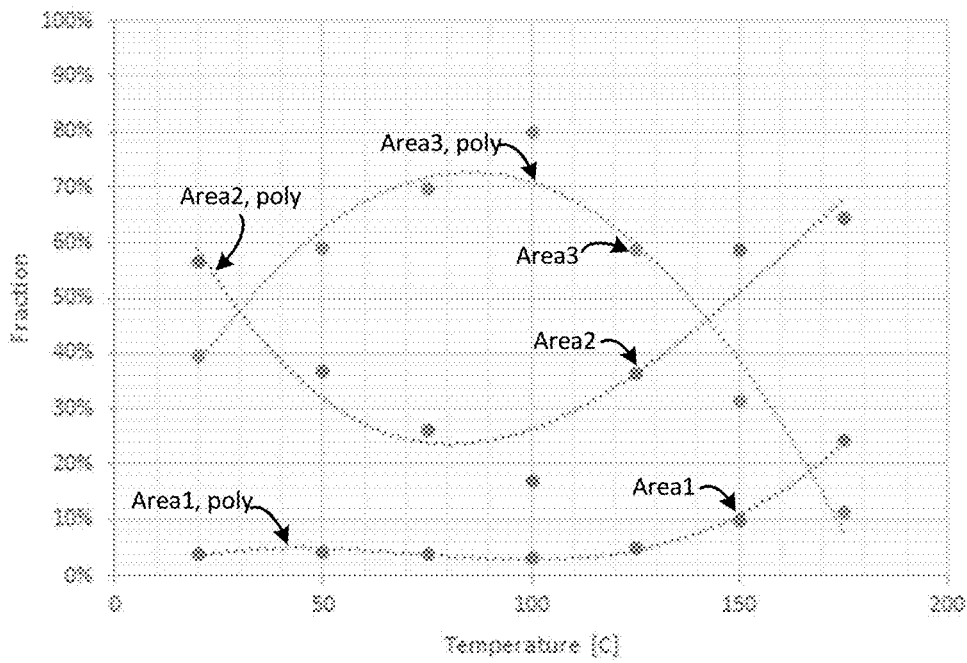
FIG. 8B shows a plot of relative fraction of decay components for a thallium-based scintillator versus temperature.

The time evolution of the number of emitted scintillation photons in a single scintillation event can often be described by linear superposition of exponential decays. For example, for TLYC the decay can be described with three exponentials over a range of at least 4 microseconds: a slow component; an intermediate component; and a fast component. FIG. 8A shows plots of scintillation decay times versus temperature for a TLYC scintillator. Also shown are simple linear or polynomial fits through the data to guide the eye (not a physics-based model). In the plots, three time components are distinguishable (measurement range of 4 microseconds) that all vary with temperature: a fast component in the range of about 60-80 ns, an intermediate component in the range of 190-430 ns and a slow component of 410 to 820 ns. As shown in FIG. 8A the average weighted fraction of total light output is also shown and drops almost linearly from 570 ns at room temperature to 210 ns at 175° C. Thus, the scintillator becomes, on average, faster with increasing temperature. The relative fraction of the three decay components shown in FIG. 8B show that at temperatures up to 150° C. the decay is dominated by the intermediate and slow component and at temperatures above 150° C. the decay is dominated by the fast component.

Charged particles and γ-quanta may have different rise and decay times when their response is measured. Thus, scintillators can be used to identify various types of radiation (γ-quanta, particles) in fluxes of mixed radiation. In one embodiment, signals produced by scintillator 240A in response to being impacted by a gamma-ray are distinguishable from the signals produced in response to scintillator 240A being impacted by a neutron (a neutron capture on Lithium will result in the production of a charged particle, and fast neutron scattering can create a recoil of a nucleus, that is also a charged particle). The signals may be distinguished using pulse shape discrimination (PSD). When TLYC is used as a scintillator material it is possible to discriminate between gamma-ray detection events and neutron detection events. This characteristic of TLYC may be exploited during spectral analysis to reduce the neutron signal under the gamma-ray spectrum, to simultaneously count thermal neutrons while detecting gamma-rays, and to simultaneously detect fast neutron background with gamma-ray spectra. In one embodiment, the TLYC scintillator 240A may be wrapped in neutron absorbing material such as boron-rubber to reduce the neutron background in the gamma-ray spectrum. Further, TLYC can be either produced with Li that is enriched or depleted in Li-6, and the Li-6 content can be varied from 0% to 100%. Therefore, the neutron sensitivity of the scintillator material can be tailored to the needs of the measurement.

Using TLYC as a scintillator material may also have advantages for gamma-ray scintillation detector 240 employing gain stabilization. It is known that the electronics, such as the PMT 240B, may be affected by temperature, and, thus, the gain of the measurements may shift during use of the tool 135. As noted above, a gamma-ray stabilization source 220 can be used for generating a spectrum to control and stabilize the gain of the detector 240 under varying environmental conditions. Gain stabilization can be applied to the photo peak of the stabilization source 220, which for a $^{137}$Cs stabilization source is a well documented 662 keV peak. One characteristic of TLYC is that its effective atomic number is about 38% higher than for NaI(Tl) and its density is about 25% larger. Since the photo peak efficiency scales with approximately the 4th power of atomic number and linearly with density, the photo peak efficiency of a TLYC scintillator having the same size of a NaI(Tl) scintillator is over 4.5 times higher than for NaI(Tl). Thus, for the same source strength and scintillator size as an NaI(Tl) scintillator, the gain stabilization when using a TLYC scintillator can converge significantly faster. For example, in LWD it is often required that a detector be operational after a minute or less after powering it up. A detector that converges faster to a stable gain is advantageous as it is more reliable and more accurate.

FIG. 5 shows a pulse height spectrum comparison between a Ce-doped TLYC crystal and an NaI(Tl) crystal of larger size than the TLYC crystal. In the example, $^{137}$Cs was used as the stabilizing source 220. In FIG. 5 the TLYC spectrum has been gain adjusted to overlay the NaI(Tl) spectrum in the photo peak position (on the right). The ratio of counts between the photo peak and the remainder of the spectrum is significantly larger for TLYC than for NaI(Tl). The peak width of the TLYC spectrum is only 80% of that of NaI(Tl), indicating improved energy resolution. The TLYC spectrum shows different non-proportionality at low channel numbers. The improved energy resolution over other scintillator materials can also improve gain stabilization.

Gain stabilization is often based on comparing count rates in windows symmetrically placed around the nominal center of the photo peak of a pulse height energy spectrum. Ratios or differences of counts in a given time period can be used to compute a form factor that is used to correct the high voltage output by high voltage source 240D (and therefore the gain) of the associated photomultiplier tube 240B. The advantage of using TLYC as the scintillator material of the gamma-ray scintillation detector 240 is that because it exhibits high energy resolution and narrower photo peak (as compared to NaI(Tl)), the windows can also be made narrower, even while maintaining the same count rate as a detector with the same properties, but poorer energy resolution. As a consequence, the gain stabilization of the gamma-ray scintillation detector 240 can be made more accurate when TLYC is used as a scintillator material as compared with the other scintillator materials mentioned above that are used in downhole detectors. A more accurate gain stabilization results in a more accurate measurement of formation properties. An advantage of higher detector resolution is also that smaller (lower activity) stabilization sources can be used. The lower resulting background spectrum due to the stabilization source leads to improved measurement precision.

Another characteristic of the TLYC pulse height spectrum in FIGS. 5 and 9, which can be used for gain stabilization, is that there is an X-ray escape peak that accompanies the photo peak. The X-ray escape peak is well defined and has a relative amplitude and energy with respect to the photo peak, which are characteristics of the TLYC material. The X-ray escape peak visible in the TLYC spectrum can be modeled and corrected for. Therefore, due to the characteristic relative locations of the X-ray peak and the photo peak, either or both peaks may be used for gain stabilization.

Using TLYC as a scintillator material of the gamma-ray scintillation detector 240 may also be advantageous for other density measurements, such as gamma-gamma density measurement using a gamma-ray source. For example, GSO is occasionally used as a density detector. The advantages of TLYC over GSO in resolution and temperature performance mentioned above also apply to density detectors. Another advantage of TLYC over GSO in this application is that TLYC does have a smaller neutron cross section. In a case where thermal neutrons are present in the radiation field, GSO will detect more background under the gamma spectrum than TLYC. This applies in particular to modern LWD tools where the scintillator 240A may be placed in close proximity to a neutron source (i.e., source 215).

Also, in comparison to the other scintillator materials, the use of TLYC may permit size and weight reduction of the scintillator material and the tool into which it is placed, and such size and weight reductions may be made without reduction in precision of the measurements obtained by a detector using the smaller scintillator. As energetic gamma-rays often produce fast (so called hot) electrons, the radiation length is a good approximation of the "efficiency" or effectiveness of a material to stop a gamma-ray in a given distance. As shown above in Table 1, the radiation length of TLYC is over 40% shorter than that of NaI(Tl), which may provide an estimate that the dimensions (e.g., diameter) of the TLYC scintillator 240A can be reduced by about half in comparison to a comparable NaI(Tl) scintillator having the same efficiency. In addition, the radiation length of TLYC is shorter than that of LaBr, so that as between LaBr and TLYC scintillator crystals of the same efficiency, the TLYC scintillator crystal may have a smaller size (e.g., diameter).

A reduced diameter scintillator may be advantageous since it makes possible an overall smaller detector diameter, which in-turn makes a smaller tool diameter possible. A smaller tool diameter is advantageous because a logging tool has to fit into a small diameter constricted by the dimensions of the borehole, the casing, or tubing. Therefore, if the diameter of the tool can be reduced, the tool may be able to fit into smaller diameter wells, making the tool useful to possibly more wells. A smaller diameter detector may also be advantageous in MWD/LWD applications requiring a gamma-ray scintillation detector with azimuthal sensitivity, which is commonly achieved by adding shielding to the backside of the detector, limiting the usable crystal diameter. By reducing the size of the gamma-ray scintillation detector, additional shielding may be added without rendering the overall size of the tool too large to fit in the well.

Also, additional shielding may be placed between the scintillator 240A and the stabilization source 220, which may reduce tool background radiation taking pathways through the tool instead of through the formation, and may reduce borehole effects from radiation scattered by the mud and affecting the formation signal. The reduction of background radiation can improve the measurement precision of the tool as the background radiation would otherwise add to the statistical uncertainty of the gamma-ray measurements. The reduction of background radiation may also improve accuracy as the tool background radiation or mud properties may be variable and the variation of these properties may not be easily traceable, leaving an unknown bias on the gamma-ray measurements.

Also, any freed up space in the tool that is made available as a result of using a smaller TLYC scintillator material may also permit the placement of at least one additional gamma-ray scintillator detectors (for example in an array of scintillator detectors) in the logging tool, which can provide additional logging information, such as information about invasion or mud cake. In such an embodiment, the measurements of the additional detector may be used to correct other measurements for borehole, mud cake, or invasion effects.

In addition to size reduction, a smaller TLYC-based scintillation detector may have at least the same statistical precision as a larger NaI(Tl)-based scintillation detector having the same efficiency. Stated differently, in a comparison between two gamma-ray detectors in the constrained geometry of a downhole tool—one a NaI(Tl) based detector with a scintillator crystal of a certain size, and one a TLYC based detector with a scintillator crystal of the same size—the statistical precision of the measurements of gamma-rays obtained by the TLYC based detector will be improved over the NaI(Tl) based detector by at least a factor of 1.4. Also, TLYC outperforms other high-resolution materials such as Ce-doped $LaBr_3$ and $CeBr_3$ in terms of being more cost effective and less reactive, which can prevent degradation and simplify packaging of the scintillator material in the tool.

The improved precision of gamma-ray measurements attributable to using a TLYC scintillator may permit faster logging speeds than are possible using the aforementioned other scintillator materials. For example, logging speeds for a TLYC-based scintillation detector may be twice as fast as logging speeds for a comparable NaI(Tl)-based scintillation detector having a NaI(Tl) scintillator that is the same size as a TLYC scintillator of the TLYC-based detector. Faster logging speed is an operational advantage because the logging operation can be done in a shorter period of time and/or with better precision as compared to logging with detectors using other scintillator materials. In-turn, increased logging speeds can save valuable rig time for the customer and can generate operational savings for the logging company.

Figure 10:
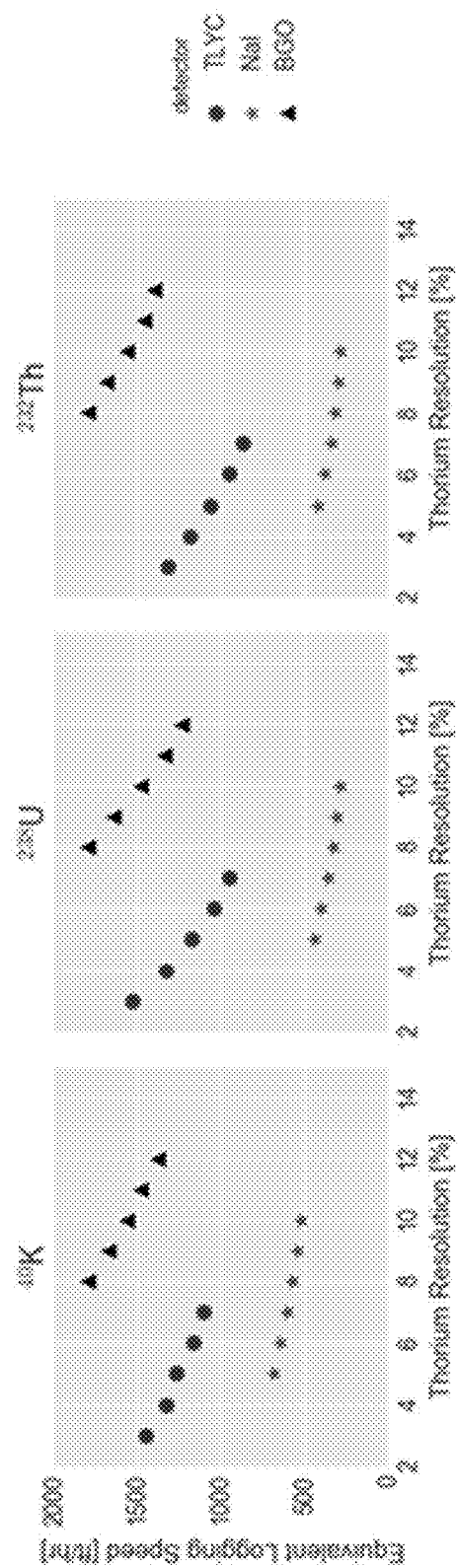
FIG. 10 shows three plots of equivalent logging speed versus thorium resolution for three different scintillator materials and for three different isotopes (K, Th, and U) to be measured.

FIG. 10 shows a comparison of equivalent logging speeds achievable with TLYC versus BGO and NaI(Tl) scintillators of equal size in a generic gamma-ray detector tool. The plots are shown for a range of possible different energy resolutions of the detector and the range varies with the material. As shown in the three plots, the TLYC material outperforms NaI(Tl) at any realistically expected energy resolution and for any of the 3 isotopes detected in natural gamma ray measurements. Also, while BGO appears to have higher logging speeds than TLYC, it is expected that this effect is time limited because for BGO, the resolution will degrade quickly at elevated temperature. Therefore, it is expected that in each logging job after a certain time from the start of the logging TLYC will outperform BGO when both materials are used at typical elevated downhole temperatures for prolonged periods of time.

There are other mechanical advantages of reducing the size of the scintillator 240A. For example, the scintillator 240A may be mounted on a mounting to which forces are transmitted during movement of the tool. By reducing the size of the scintillator 240A, the total weight of the scintillator 240A may be reduced, and, in addition, a lever arm to the crystal mounting can be made shorter. Consequently, the forces applied to the detector mounting can be rendered smaller when the detector is shocked or vibrated, thus reducing the probability of a tool failure. Therefore, detector reliability may be improved by reducing the size of the scintillator crystal.

Also, some scintillator materials require careful packaging and sealing to protect them from their environment. For example, LaBr is significantly more reactive than TLYC and, thus, the sealing of LaBr is more critical to its performance as a scintillator. On the other hand, TLYC is less prone to degrade under the influence of a reactive atmosphere, and, therefore, using TLYC instead of LaBr has advantages in that the hermetic packaging of the TLYC scintillator material can be simplified and made more cost-effective over the hermetic packaging of LaBr.

Note, that although a passive cooling may not be required to maintain scintillation performance of TLYC material when in use at elevated temperatures in a downhole environment, the use of passive cooling (e.g., a Dewar) may still be employed along with other forms of thermal insulation for different purposes, for example protecting the scintillator crystal from mechanical stress such as from a thermal shock event.

Figure 11:
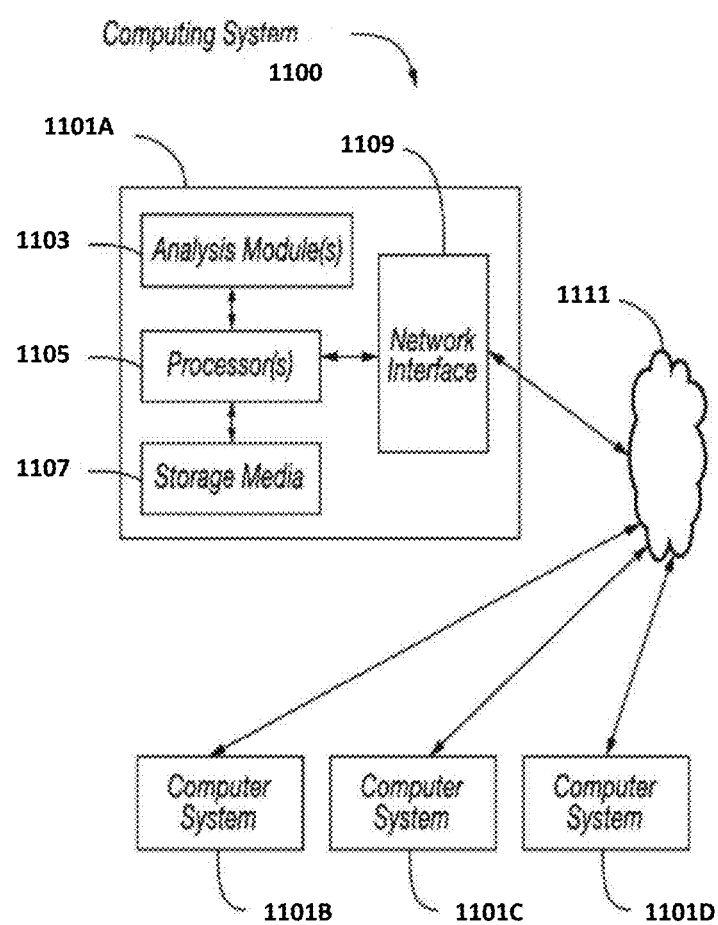
FIG. 11 is a schematic computing system in accordance with an aspect of the disclosure.

FIG. 11 shows an example computing system 1100 that can be used to implement the high-performance computing center 203 of FIG. 1 or parts thereof. The computing system 1100 can be an individual computer system 1101A or an arrangement of distributed computer systems. The computer system 1101A includes one or more analysis modules 1103 (a program of computer-executable instructions and associated data) that can be configured to perform various tasks according to some embodiments, such as the tasks described above. To perform these various tasks, an analysis module 1103 executes on one or more processors 1105, which is (or are) connected to one or more storage media 1107. The processor(s) 1105 is (or are) also connected to a network interface 1109 to allow the computer system 1101A to communicate over a data network 1111 with one or more additional computer systems and/or computing systems, such as 1101B, 1101C, and/or 1101D. Note that computer systems 1101B, 1101C and/or 1101D may or may not share the same architecture as computer system 1101A, and may be located in different physical locations.

The processor 1105 can include at least a microprocessor, microcontroller, processor module or subsystem, programmable integrated circuit, programmable gate array, digital signal processor (DSP), or another control or computing device.

The storage media 1107 can be implemented as one or more non-transitory computer-readable or machine-readable storage media. Note that while in the embodiment of FIG. 11, the storage media 1107 is depicted as within computer system 1101A, in some embodiments, storage media 1107 may be distributed within and/or across multiple internal and/or external enclosures of computing system 1101A and/or additional computing systems. Storage media 1107 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 1103 can be provided on one computer-readable or machine-readable storage medium of the storage media 1107, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 1100 is only one example of a computing system, and that computing system 1100 may have more or fewer components than shown, may combine additional components not depicted in the embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the operations of the high-performance computing center 203 as described herein may be implemented by running one or more functional modules in an information processing apparatus such as general purpose processors or application specific chips, such as ASICs, FPGAs, PLDs, SOCs, or other appropriate devices. These modules, combinations of these modules, and/or their combination with general hardware are all included within the scope of the disclosure.

In one embodiment, the operations of the high-performance computing center 203 as described herein may be implemented by running one or more functional modules in a cloud-based information processing apparatus.

In still other embodiments, the operations of the high-performance computing center 203 as described herein may be implemented by running one or more functional modules in an information processing apparatus located at or near the wellsite and/or in an information processing apparatus that is part of the BHA of the downhole tool.

The methods and processes described above that analyze (e.g., spectral analysis) the output of the gamma-ray scintillation detector may be performed by a processing system. The processing system may include a single processor, multiple processors, or a computer system. Where the processing system includes multiple processors, the multiple processors may be disposed on a single device or on different devices at the same or remote locations relative to each other. The processor or processors may include one or more computer processors (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Thus, the methods and processes described above may be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, Matlab, JAVA or other language or environment). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

It will also be understood that the gamma-ray measurement(s) as described herein can be embodied in a wireline logging tool that is conveyed inside the wellbore for determining properties of the formation as is well known in the art. The wireline logging tool can be conveyed in the wellbore by a wireline cable, drill pipe, coiled tubing, tractor, or other suitable tool conveyance means.

To the extent used in this description and in the claims, a recitation in the general form of "at least one of [a] and [b]" should be construed as disjunctive. For example, a recitation of "at least one of [a], [b], and [c]" would include [a] alone, [b] alone, [c] alone, or any combination of [a], [b], and [c].

Although a few example embodiments have been described in detail above, those skilled in the art will readily appreciate that many modifications are possible in the example embodiments without materially departing from embodiments disclosed herein. Accordingly, all such modifications are intended to be included within the scope of this disclosure.

What is claimed is:

1. A subsurface logging tool deployable in a wellbore that traverses a formation, the logging tool comprising:
    a tool housing configured for movement within and along the wellbore; and
    a scintillation detector housed in the tool housing, wherein the scintillation detector includes a thallium-based scintillator material and the scintillator material has a minimum light output of 4,000 ph/MeV when operating at a temperature of 125° C.

2. The logging tool according to claim 1, wherein the scintillation detector is a gamma-ray scintillation detector.

3. The logging tool according to claim 1, wherein the scintillator material has an effective atomic number of at least sixty.

4. The logging tool according to claim 1, wherein the scintillator material has a minimum light output of 4,500 ph/MeV when operating at a temperature up to 100° C.

5. The logging tool according to claim 4, wherein the scintillator material has a minimum light output of 3,500 ph/MeV when operating at a temperature of 150° C.

6. The logging tool according to claim 5, wherein the scintillator material has a minimum light output of 3,000 ph/MeV when operating at a temperature of 175° C.

7. The logging tool according to claim 6, wherein the scintillator material has a minimum light output of 2,500 ph/MeV when operating at a temperature of 200° C.

8. The logging tool according to claim 1, wherein the detector is configured to measure naturally emitted radiation from a formation.

9. The logging tool according to claim 1, further comprising:
    a gamma-ray source configured to emit gamma radiation, wherein the gamma-ray scintillation detector is configured to measure gamma-gamma density of the formation.

10. The logging tool according to claim 2, further comprising:
    a neutron source configured to emit neutrons from the tool into the formation to induce gamma-rays, wherein the gamma-ray scintillation detector is configured to measure the neutron induced gamma-rays from the formation.

11. The logging tool according to claim 1, wherein the scintillator material is formed of an undoped TLYC material.

12. The logging tool according to claim 11, wherein the TLYC material includes Li that is enriched or depleted in Li-6.

13. The logging tool according to claim 1, wherein the scintillator material is in a crystalline or polycrystalline form.

14. The logging tool according to claim 2, further comprising:
    a voltage source coupled to the gamma-ray scintillation detector, wherein gain of the gamma-ray scintillation detector is stabilized based on a feedback signal to control voltage supplied by the voltage source to the gamma-ray scintillation detector.

15. The logging tool according to claim 14, further comprising:
    a stabilization circuit configured to receive output of the gamma-ray scintillation detector and output the feedback signal to the voltage source, wherein the feedback signal is based on analysis of a measured spectrum output by the scintillation detector.

16. The logging tool according to claim 15, wherein the stabilization circuit determines the feedback signal based on analysis of characteristics of an escape peak and photo peak in both a reference spectrum and a measured spectrum.

17. The logging tool according to claim 2, further comprising:
    an event discriminator coupled to the gamma-ray scintillation detector, wherein the event discriminator is configured to analyze output of the gamma-ray scintillation detector and implement pulse-shaped discrimination based on the output to distinguish between a gamma-ray event and a neutron detection event.

18. The logging tool according to claim 1, wherein the scintillator material has the chemical formula: $Tl_2MAHa_6$;
    wherein "Tl" is thallium;
    wherein "M" is at least one of Lithium (Li), Sodium (Na), Potassium (K), Rubidium (Rb), Cesium (Cs), and Indium (In);
    wherein "A" is at least one of Yttrium (Y), Lanthanum (La), Praseodymium (Pr), Neodymium (Nd), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu); and
    wherein "Ha" is at least one of chlorine (Cl), Fluorine (F), Bromine (Br), and Iodine (I).

19. The logging tool according to claim 18, wherein the scintillator material has the chemical formula: $Tl_2LiYCl_6$.

20. The logging tool according to claim 1, wherein the scintillator material has the chemical formula: $Tl_2MA_{1-x}Dp_xHa_6$;
wherein "Tl" is thallium;
wherein "M" is at least one of Lithium (Li), Sodium (Na), Potassium (K), Rubidium (Rb), Cesium (Cs) and indium (In);
wherein "A" is at least one of Yttrium (Y), Lanthanum (La), Praseodymium (Pr), Neodymium (Nd), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu);
wherein "Ha" is at least one of chlorine (Cl), Fluorine (F), Bromine (Br), and Iodine (I));
wherein "Dp" is at least one of Cerium (Ce), Praseodymium (Pr), Neodymium (Nd), Europium (Eu), Gadolinium (Gd), Terbium (Tb), and Dysprosium (Dy); and
wherein "x" is a number between 0 and 1.

21. The logging tool according to claim 20, wherein the scintillator material has the chemical formula: $Tl_2LiY_{1-x}Ce_xCl_6$.

22. A subsurface logging tool deployable in a wellbore that traverses a formation, the logging tool comprising:
a tool housing configured for movement within and along the wellbore;
a gamma-ray scintillation detector housed in the tool housing, wherein the gamma-ray scintillation detector includes a thallium-based scintillator material;
a voltage source coupled to the gamma-ray scintillation detector, wherein gain of the gamma-ray scintillation detector is stabilized based on a feedback signal to control voltage supplied by the voltage source to the gamma-ray scintillation detector; and
a stabilization circuit configured to receive output of the gamma-ray scintillation detector and output the feedback signal to the voltage source, wherein the stabilization circuit determines the feedback signal based on analysis of characteristics of an escape peak and photo peak in both a reference spectrum and a measured spectrum.

* * * * *